United States Patent [19]

Ohsawa

[11] 3,748,582

[45] July 24, 1973

[54] CONTROL SIGNAL GENERATING CIRCUIT FOR SHARP FREQUENCY RESPONSE TUNING

[75] Inventor: Mitsuo Ohsawa, Kanagawa, Japan

[73] Assignee: Sony Corporation, Tokyo, Japan

[22] Filed: Oct. 6, 1971

[21] Appl. No.: 187,013

Related U.S. Application Data

[63] Continuation-in-part of Ser. No. 142,827, May 15, 1970.

[30] Foreign Application Priority Data

May 15, 1970 Japan ............................ 45/4184770
Oct. 8, 1970 Japan ............................ 45/8861470

[52] U.S. Cl. ................. 325/344, 325/349, 325/363, 325/398, 325/319, 325/455, 334/30, 334/31, 334/86

[51] Int. Cl. ............................................. H04b 1/06

[58] Field of Search .................... 325/344, 349, 351, 325/363, 398, 45, 455, 319, 337; 334/30, 31, 86

[56] References Cited

UNITED STATES PATENTS

| | | | |
|---|---|---|---|
| 3,333,201 | 7/1967 | Hopengarten | 334/31 |
| 2,518,461 | 8/1950 | Godbey | 325/337 |

*Primary Examiner*—Albert J. Mayer
*Attorney*—Lewis H. Eslinger et al.

[57] ABSTRACT

An improved control signal generating circuit for a frequency modulation receiver having a plurality of intermediate-frequency amplifier stages and including two relatively narrow band detection circuits and combiner to add the detected output signals of the circuits selectively to obtain a sharp frequency response characteristic, especially for controlling a tuning meter.

6 Claims, 7 Drawing Figures

CONTROL SIGNAL GENERATING CIRCUIT FOR SHARP FREQUENCY RESPONSE TUNING

BACKGROUND OF THE INVENTION

1. Field of the Invention

This invention is a continuation-in-part of my co-pending application Ser. No. 142,827, filed May 15, 1970 and entitled CONTROL SIGNAL GENERATING CIRCUIT.

This invention relates to the field of frequency modulation receiver control circuits and in particular to means for generating a narrow band, sharply tuned, control signal.

2. The Prior Art

In order to determine optimum tuning of a frequency modulation (FM) receiver, it has been proposed heretofore to use a tuning meter driven by a uni-directional signal that is produced by rectifying an intermediate-frequency signal. However, the inclusion of a limiter in the intermediate-frequency (IF) amplifier section of an FM receiver makes it impossible to obtain a sharp peak value at the optimum tuning point. In the aforesaid application Ser. No. 142,827, it has been proposed to control the operation of a detector circuit with an output produced by rectifying the IF signal supplied to a narrow bandpass amplifier.

It is one of the objects of the present invention to provide a still more accurate determination of the optimum tuning point by combining detected signals from a narrow bandwidth circuit in such a way that the overall frequency response is quite sharply pointed. Because of this sharp point in the response, the signal can be used to control a tuning meter very accurately to indicate when the receiver is precisely tuned to the carrier frequency of the transmitting station.

BRIEF DESCRIPTION OF THE INVENTION

In the present invention, one output signal is obtained from the same part of the circuit as the regular audio signal. However, the extra signal is passed through a filter that further restricts its bandwidth so that it produces a relatively steady signal that has a positive value on one side of the carrier freqency and a negative value on the other side of the carrier frequency. In general, this signal varies in accordance with the usually S-shaped curve of a frequency modulation discriminator but only over a very narrow band of frequencies. Another signal is obtained from the frequency modulation detector and this second signal has, in effect, a bandpass shape. The signal having the S-shaped response is passed through a rectifier circuit and is then added to the second signal having the bandpass-shaped response to obtain the equivalent of a sharply pointed frequency response, the narrow point of which corresponds exactly to tuning the receiver to the carrier of the transmitter. The frequency response of these circuits is so low that they will not respond to audio frequency signals and thus the indication of correct tuning is not affected by the audio signal.

DETAILED DESCRIPTION OF THE INVENTION

Figure 1:
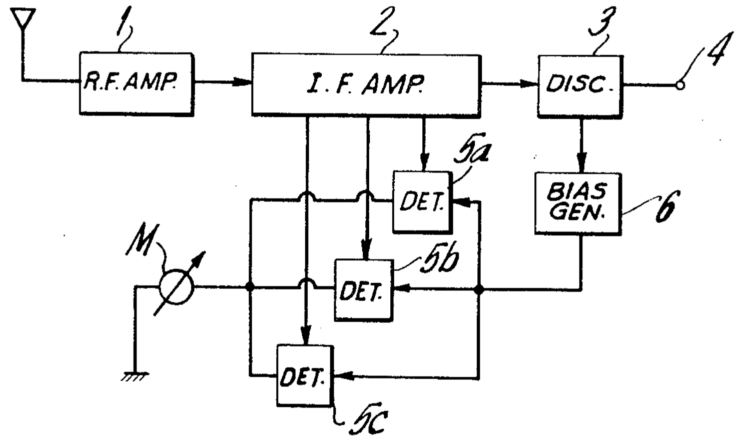
FIG. 1 is a block diagram of an FM receiver input circuit according to the present invention for generating a sharply defined control signal.

FIG. 1 shows the input section of an FM receiver, including a tunable radio frequency amplifier 1 connected to a multi-stage IF amplifier 2. The output of the last stage of the IF amplifier is connected to a frequency modulation detector, or discriminator, 3 to produce an audio output signal at the terminal 4. Three detectors 5*a*, 5*b*, and 5*c* are connected to different stages in the IF amplifier 2. A bias signal generator 6 is connected to the frequency modulation detector 3 to generate an output signal which is connected to each of the three detectors 5*a*–5*c*. The outputs of the detectors are connected together to a meter M that indicates the tuning of the receiver with respect to an incoming carrier and shows when the receiver is properly tuned to the exact center frequency.

Figure 2:
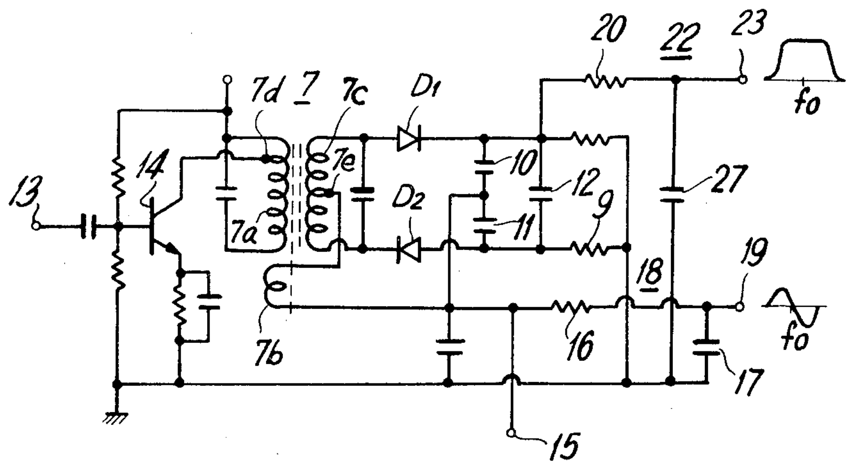
FIG. 2 shows a frequency modulation detector with means for deriving therefrom two signals to be used in generating a control signal in the circuit of FIG. 1.

FIG. 2 is one example of a frequency modulation detector suitable for use in the circuit in FIG. 1. The detector shown in FIG. 2 is a ratio detector although a Foster-Seeley discriminator may also be used for this purpose. The ratio detector comprises a transformer with primary windings 7*a* and 7*b* and a secondary winding 7*c*. Two diodes $D_1$ and $D_2$ are connected in reverse polarity to the ends of the secondary winding 7*c*, and two resistors 8 and 9 are connected in series between the diodes $D_1$ and $D_2$. A pair of capacitors 10 and 11 is connected in series across the resistors 8 and 9, and a relatively large capacitor 12 is also connected across the resistors 8 and 9 to stabilize the voltage across the capacitors 10 and 11.

An IF input signal is applied to the circuit in FIG. 2 by way of an input terminal 13 connected to a transistor amplifier 14. The output of the transistor amplifier 14 is connected to a tap 7*d* on the primary winding 7*a* of the transformer 7. An intermediate tap 7*e* of the secondary winding 7*c* is connected to one end of the primary winding 7*b*, and the other end of this primary winding 7*b* is connected to the audio frequency output terminal 15 and to a resistor 16. This resistor 16 and a capacitor 17 connected from the other end of the resistor to ground comprise a low-pass filter 18 having a response too narrow to permit audio signals to pass through. The output of the filter 18 is derived at a terminal 19 and, as the receiver RF amplifier 1 shown in FIG. 1 is tuned relatively slowly through a frequency band that includes the carrier frequency of the incoming signal, the voltage at the terminal 19 varies in accordance with an S-shaped curve having a zero point that corresponds to the carrier frequency and is indicated as $f_0$.

A second output signal is obtained from the ratio detector by way of resistor 20 connected to the function of the diode $D_1$, the capacitors 10 and 12, and the resistor 8. The resistor 20 and a capacitor 21, connected from its other end to ground, comprise a low-pass filter 22 having an output terminal 23. The response characteristic of the signal at the terminal 23 is different from that at the terminal 19 and resembles the bandpass characteristic of an amplifier centered about the frequency $f_0$. However, due to the fact that the filter 22 can transmit only low frequency signals below the audio frequency band, the signal variation of the terminal 23 would be obtained as the RF amplifier 1 in FIG. 1 was tuned slowly through the carrier frequency of the incoming signal.

The first output signal from the terminal 19 of FIG. 2 has a positive value frequencies below the center frequency $f_0$ and a negative value for frequencies above the frequency $f_0$ as indicated by the signal $S_1$ in FIG. 4A. At the frequency $f_0$, the value of the signal $S_1$ is zero. The second output signal from the terminal 23 in FIG. 2 has a constant value over a frequency range, as indicated by the signal $S_2$ in FIG. 4B. The frequency range of this signal is the same as that of the IF amplifiers 2 in FIG. 1. Therefore, this second signal is always present, even if the receiver is tuned somewhat away from the center frequency $f_0$.

Figure 3:
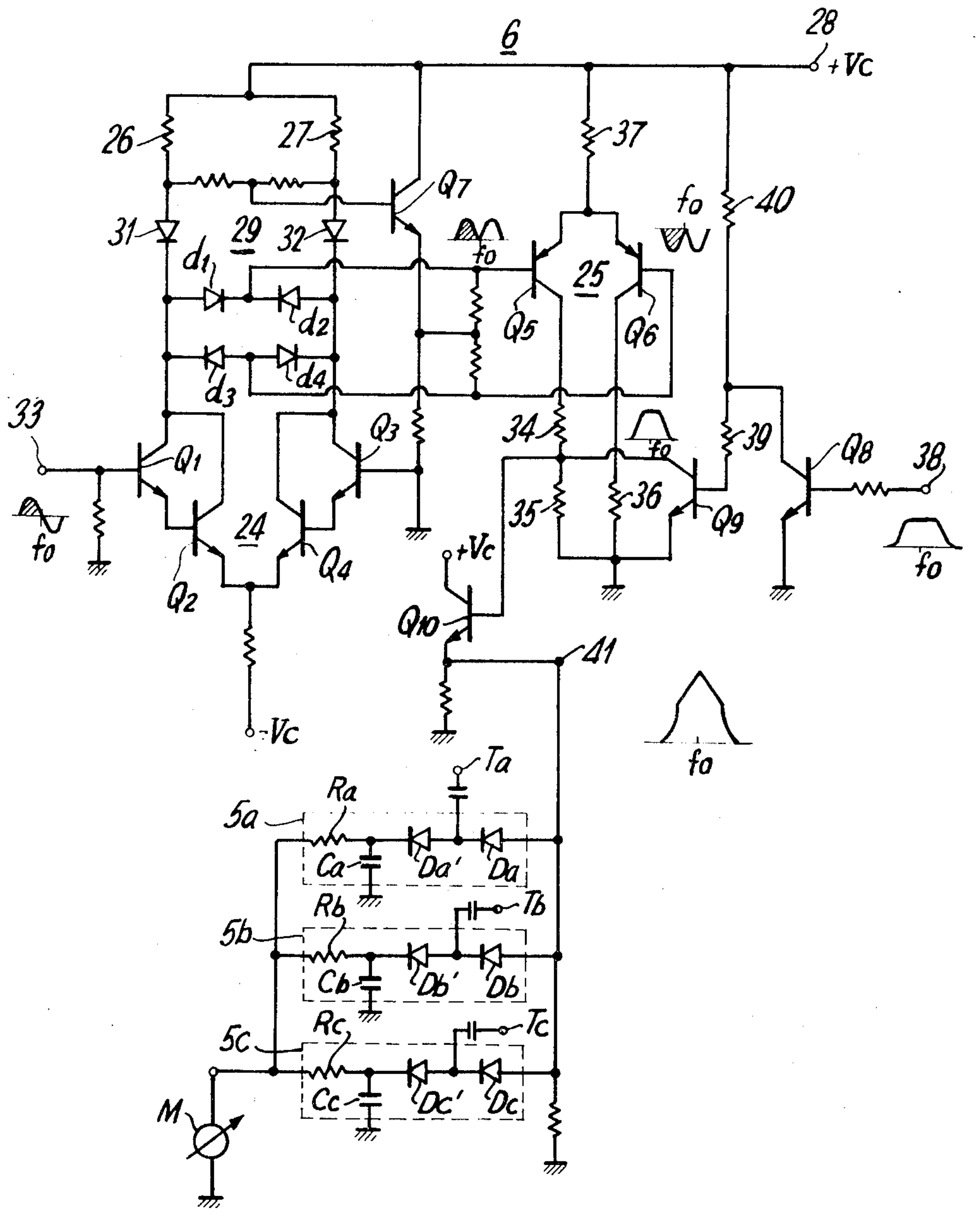
FIG. 3 is a schematic diagram of a circuit for combining the signals generated in the circuit of FIG. 2 in order to generate the desired control signal.

These first and second output signals from the terminals 19 and 23 are supplied to the bias signal generator 6 which was one of the blocks in FIG. 1 and is shown in detail in FIG. 3. This bias signal generator circuit comprises first and second differential amplifiers 24 and 25. The first differential amplifier 24 consists of four transistors $Q_1$–$Q_4$. The collectors of transistors $Q_1$ and $Q_2$ are connected directly to each other and in series with a load resistor 26. The collectors of the transistors $Q_3$ and $Q_4$ are connected directly to each other and in series with a load resistor 27. Both of the resistors 26 and 27 are connected to the positive terminal 28 of a power supply having a voltage $V_C$. A full-wave bridge rectifier circuit 29 comprising four diodes $d_1$–$d_4$ is connected between the resistors 26 and 27 and the respective transistors. Two diodes 31 and 32 are also connected in series with the resistors 26 and 27, respectively, between these resistors and the bridge rectifier circuit. The diodes 31 and 32 serve as equalizing means to equalize the voltage of the diodes $d_1$–$d_4$ of the full-wave rectifier circuit 29. The input circuit of the differential amplifier 24 is identified by reference numeral 33 and is connected to the terminal 19 in FIG. 2 to receive the first output signal from the terminal 19.

The second differential amplifier 25 consists of a pair of transistors $Q_5$ and $Q_6$. Two resistors 34 and 35 are connected in series between the collector of the transistor $Q_5$ and ground and another resistor 36 is connected in series between the collector of the transistor $Q_6$ and ground. The base of the transistor $Q_5$ is connected to one of the output terminals of the full-wave bridge rectifier circuit 29 between the diodes $d_1$ and $d_2$. The base of the other transistor $Q_6$ of the differential amplifier 25 is connected to the other output terminal of the bridge rectifier circuit 29 between the diodes $d_3$ and $d_4$ and the rectified signals applied from the bridge rectifier circuit to the bases of the transistors $Q_5$ and $Q_6$ are illustrated adjacent the respective transistors. The emitters of the transistors $Q_5$ and $Q_6$ are connected together through a resistor 37 to the positive power supply terminal 28 to complete the circuit of the differential amplifier 25.

A transistor $Q_7$ is used for supplying base bias to the transistors $Q_5$ and $Q_6$. The base of the transistor $Q_7$ is connected to both of the resistors 26 and 27 and the collector of the transistor $Q_7$ is connected directly to the power supply terminal 28. The emitter of the transistor $Q_7$ is connected to both of the bases of the transistors $Q_5$ and $Q_6$.

The circuit 6 includes another input terminal 38, which is connected to the second output terminal 23 of the ratio detector circuit in FIG. 2 to receive the second output signal therefrom. This input terminal is connected to the base of a transistor amplifier $Q_8$ that has a load resistor 40 connected between its collector and the positive power supply terminal 28. The collector of the transistor $Q_8$ is also connected by way of a resistor 39 to the base of transistor $Q_9$. The collector of the transistor $Q_9$ is connected to the junction between the resistors 34 and 35 and the signal at the collector of the transistor $Q_9$ has the same polarity as the signal applied to the input terminal 38. The base of an emitter-follower transistor $Q_{10}$ is connected to the junction between the resistors 34 and 35, and the emitter of the transistor $Q_{10}$ is connected to an output terminal 41 to supply a bias signal to the detector circuits 5*a*–5*c*.

Figure 4:
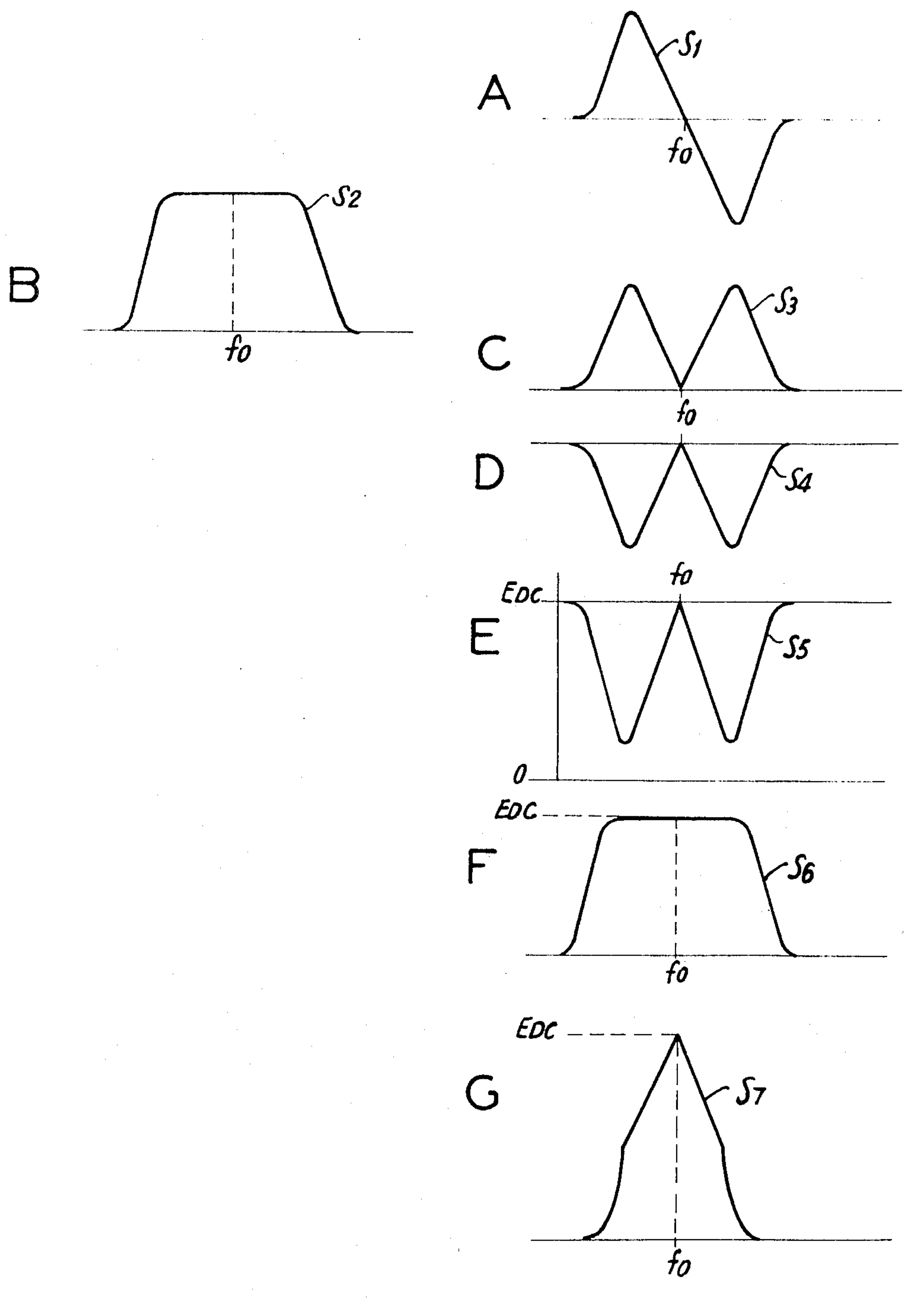
FIGS. 4A–4G show frequency response curves for various points in the circuits in FIGS. 2 and 3.

The signal $S_1$ shown in FIG. 4A is amplified by the first differential amplifier 24 and is then rectified by the full-wave rectifier 29 to produce a signal $S_3$ shown in FIG. 4C and applied to the base of the transistor $Q_5$. The rectifier 29 also provides the inverse of this signal $S_4$ shown in FIG. 4D to the base of the transistor $Q_6$. As a result, an inverted signal corresponding to the signal $S_5$ shown in FIG. 4E is obtained across the resistor 35 in the absence of any signal applied to the input terminal 38. This signal $S_5$ in FIG. 4E has a zero point at the direct voltage level $E_{DC}$. The output signal of the transistor $Q_9$ is shown in FIG. 4F as signal $S_6$ and it has a peak value of $E_{DC}$ and is also present across the resistor 35 when the signal $S_2$ of FIG. 4B is applied to the input terminal 38. Thus, these two signals across the resistor 35 are added together to produce the signal $S_7$ shown in FIG. 4G, which is the signal derived at the terminal 41 and applied to the detectors 5*a*–5*c*. This signal has a sharp peak at the center frequency that corresponds to the carrier frequency to which the RF amplifier 1 is to be tuned.

The detector circuits 5*a*, 5*b*, and 5*c* are respectively made up of series circuits of diodes D*a* and D*a'*, D*b* and D*b'*, and D*c* and D*c'*, resistors R*a*, R*b*, and R*c* and capacitors C*a*, C*b*, and C*c*. Amplified signals of the respective stages of the IF amplifier 2 of FIG. 1 are supplied through terminals Ta, Tb, and Tc to the connection points of the diodes D*a* and D*a'*, D*b* and D*b'*, and D*c* and D*c'*. With such an arrangement, the rectifying efficiency of each of the detector circuits 5*a*, 5*b*, and 5*c* is held at a very low value unless supplied with a bias from the bias voltage generating circuit 6, which may be achieved by using silicon diodes. The rectifying efficiency rapidly increases when supplied with a bias, so that the rectifying efficiency is in proportion to the value of the bias.

Figure 5:
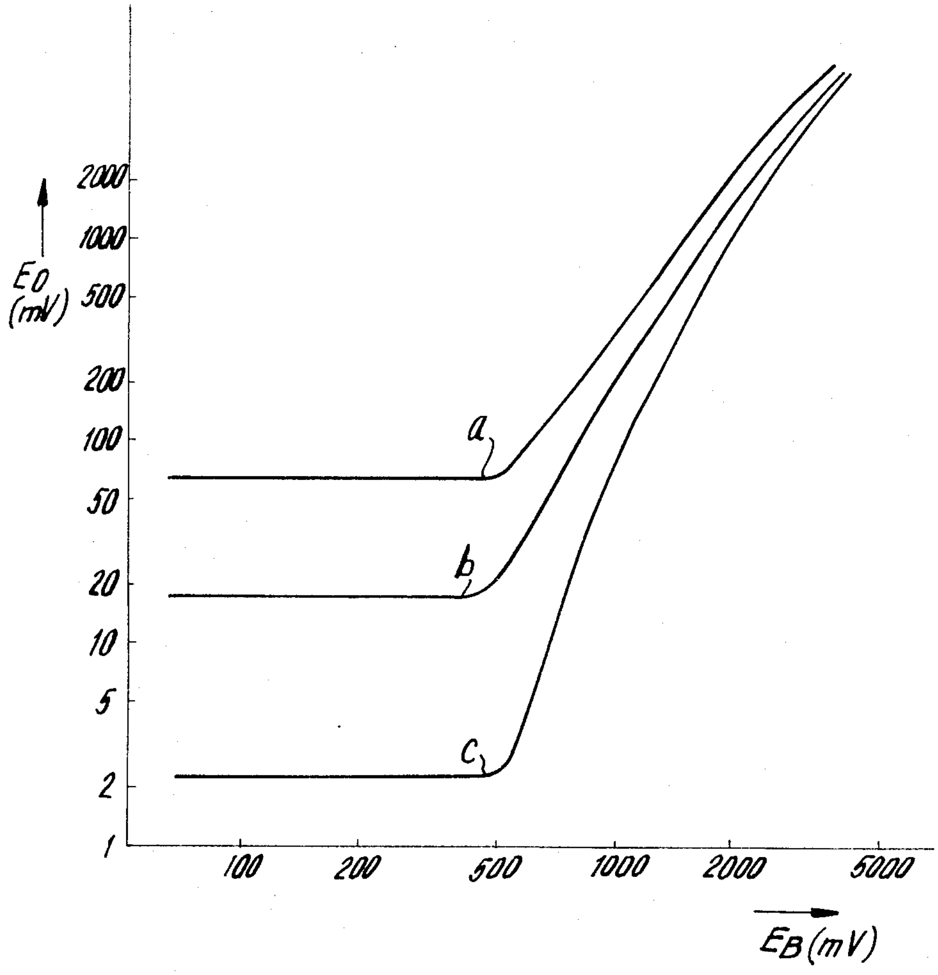
FIGS. 5–7 are graphs for explaining the operation of the circuit in FIG. 1.

In FIG. 5, curves *a*, *b*, and *c*, respectively, show characteristics of rectified output voltages $E_O$ of the detector circuits 5*a*, 5*b*, and 5*c* relative to a bias voltage $E_B$ applied thereto. The connection point of the diodes D*a* and D*a'* of the detector circuit 5*a* is supplied with an amplified signal from one of the early stages of the IF amplifier 2 in FIG. 1, the detector circuit 5*b* is supplied with an IF signal from a later stage, and the detector circuit 5*c* is supplied with an IF signal from a still later stage. Changing only the bias voltage $E_B$ and keeping the input levels of the IF signals to the detector circuits 5*a*, 5*b*, and 5*c* constant, the rectified output voltage $E_O$ abruptly increases when the bias voltage exceeds a certain value. In this case, the bias voltage $E_B$ varies with the band characteristic of the bias signal generator circuit 6, so that a maximum bias voltage is obtained at an optimum tuning point. Even if the antenna input varies a little, the maximum bias voltage is not changed by the limiter action unless the tuning point is shifted.

Thus, once optimum tuning has been established, a bias voltage of a predetermined level is obtained irrespective of the antenna input level. As a result of this, the rectifying efficiency of the detector circuits *5a*, *5b*, and *5c* is enhanced by the bias voltage to provide for constant rectifying efficiency. Rectified outputs are derived from the detector circuits *5a*, *5b*, and *5c*. The tuning meter M is driven by the rectified outputs, and hence indicates a peak value at an optimum tuning point, allowing ease in tuning with accuracy.

The detector circuits *5a*, *5b*, and *5c* are supplied with the IF signals whose levels become sequentially higher, so that even if the circuits are supplied with the same bias voltage, their rectified outputs $E_0$ become sequentially greater in proportion to the levels of the inputs thereto, as will be seen from the curves *a*, *b*, and *c* in FIG. 5. That is, the rectified output voltages $E_O$ vary with the antenna input level.

Figure 6:
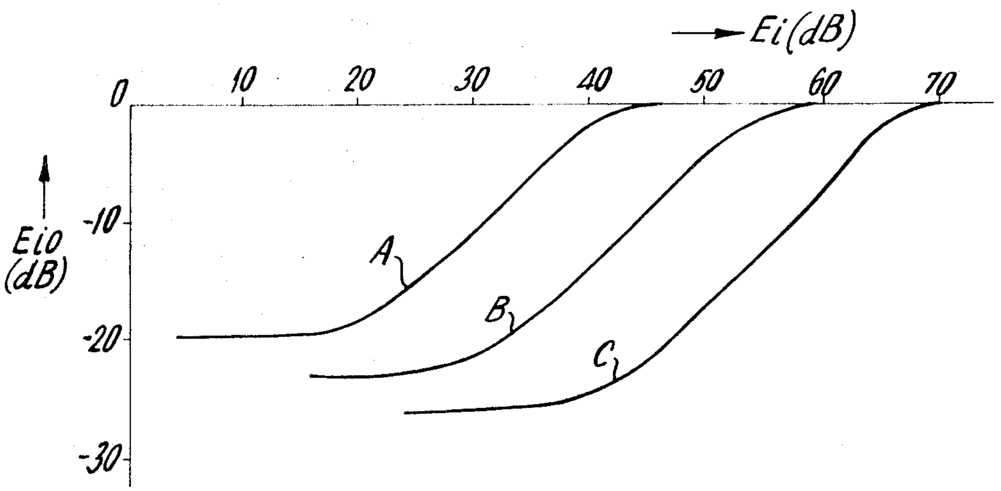
Figure 7:
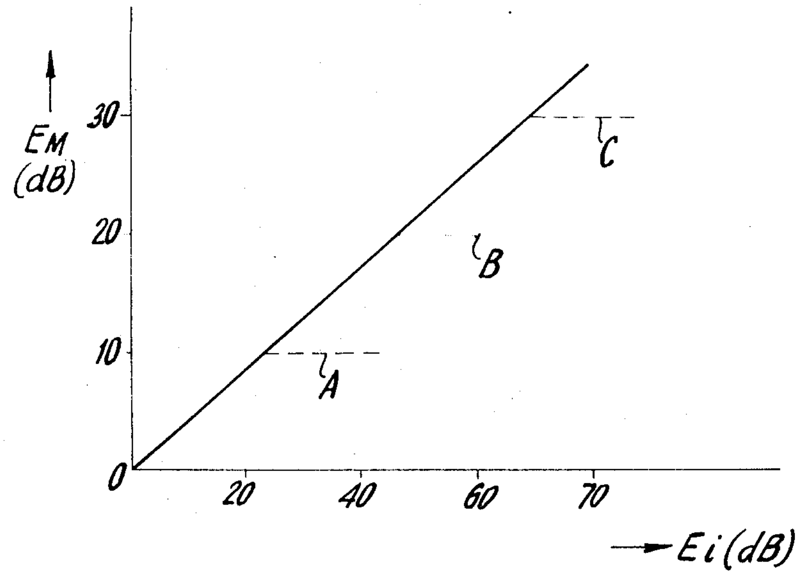

This variation of the output voltage will be described in connection with FIGS. 6 and 7. FIG. 6 shows an output $E_{i0}$ of each stage of the intermediate-frequency amplifier relative to the antenna input level $E_i$. Curve A indicates the input-output characteristics of the final, or one of the final, stages of the IF amplifier 2. Curve B indicates the input-output characteristics of an intermediate stage, and curve C indicates the input-output characteristics of an early stage of the IF amplifier. As the antenna input level $E_i$ increases, the output levels of the respective stages of the IF amplifier are sequentially saturated from the latter stage by the limiter action. Accordingly, when the outputs of the respective stages of the IF amplifier are added together after being rectified, the added signal level $E_M$ becomes proportional to the antenna input level $E_i$ as depicted in FIG. 7. Since this added signal is supplied to the tuning meter M, the indication of the meter M is in proportion to the antenna input. Thus, the tuning meter M also functions as a field intensity meter.

The foregoing example employs three detector circuits but, in the case of mere tuning indication, the number of the detector circuits may well be reduced to one, as disclosed in the co-pending application, because the rectified output is produced only at the time of tuning operation.

What is claimed is:

1. A tuning indicating circuit for a tuned amplifier capable of amplifying signals in a frequency band that includes a predetermined frequency, said circuit comprising:

A. A frequency-modulation detector connected to said amplifier and having an S-shaped response curve that goes smoothly through zero response at said predetermined frequency and produces an output signal, the amplitude of which is proportional to the magnitude of the frequency difference between said predetermined frequency and the instantaneous frequency of said signals and has one polarity for signals below said predetermined frequency and the opposite polarity for signals above said predetermined frequency;

B. Full-wave rectifier means connected to said detector to rectify said output signal whereby the combined frequency response of said detector and said rectifier means has a sharp change at said predetermined frequency, and said rectifier means has an output signal that has the same polarity on both sides of said predetermined frequency;

C. Second means connected to said detector to derive therefrom a pedestal signal and having a unidirectional response characteristic for signals on both sides of said predetermined frequency and within said band;

D. Combining means connected to said rectifier means and to said second means for combining said pedestal signal and said output signal of said rectifier means in such polarity that the overall response of said tuning indicating circuit exhibits a sharp peak at said predetermined frequency; and E. Indicating means connected to said combining means to indicate, by response to said output signal of said rectifier means at said sharp peak, the tuning of said tuned amplifier.

2. The invention according to claim 1 comprising, in addition, amplitude detector means connected to said tuned amplifier to receive said signals therefrom and connected between said combining means and said indicating means, whereby the output signal from said combining means is a bias signal for said amplitude detector means.

3. The invention according to claim 1 comprising, in addition, a low-pass filter connected between said frequency-modulation detector and said rectifier means to limit the frequency of signals applied to said rectifier means to frequencies below the audio band.

4. The invention according to claim 1 comprising, in addition, a differential amplifier connected to said rectifier means to amplify said output signal from said rectifier means differentially.

5. The invention according to claim 4 in which:

A. Said differential amplifier comprises:
   1. a first transistor,
   2. a second transistor, and
   3. first and second resistors connected in series as a collector load for said first transistor, said second resistor having said pedestal signal thereacross; and B. Said combining means also comprises a third transistor having output terminals connected across said second resistor and being connected to said second means to add said second signal to said first signal across said second resistor.

6. The invention according to claim 2 in which said tuned amplifier comprises at least first and second stages connected in cascade and said amplitude detector means comprises:

A. A first detection circuit connected to said first stage to derive a signal therefrom; and B. A second detection circuit connected to said second stage to derive a signal therefrom, said combining means being connected to apply said bias signal to both of said detection circuits, and said indicator being connected to both of said detection circuits.

* * * * *